(12) United States Patent
Kaida et al.

(10) Patent No.: US 7,374,700 B2
(45) Date of Patent: May 20, 2008

(54) HEXENEDIYNE DERIVATIVE

(75) Inventors: Yuriko Kaida, Yokohama (JP); Makoto Hasegawa, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/767,215

(22) Filed: Jun. 22, 2007

(65) Prior Publication Data

US 2007/0241310 A1  Oct. 18, 2007

Related U.S. Application Data

(63) Continuation of application No. PCT/JP2005/023522, filed on Dec. 12, 2005.

(30) Foreign Application Priority Data

Dec. 22, 2004 (JP) ............... 2004-371368

(51) Int. Cl.
| | |
|---|---|
| C09K 19/30 | (2006.01) |
| C09K 19/66 | (2006.01) |
| C07C 43/215 | (2006.01) |
| C07C 22/04 | (2006.01) |
| C07C 22/08 | (2006.01) |
| C07C 21/18 | (2006.01) |
| C07C 21/22 | (2006.01) |

(52) U.S. Cl. ............... 252/299.63; 252/299.66; 428/1.1; 570/128; 570/129

(58) Field of Classification Search ........... 252/299.63, 252/299.66; 428/1.1; 570/128, 129
See application file for complete search history.

(56) References Cited

U.S. PATENT DOCUMENTS

| 5,370,819 A | 12/1994 | Fujita et al. |
| 5,419,851 A | 5/1995 | Yokokoji et al. |
| 5,554,316 A | 9/1996 | Fujita et al. |

FOREIGN PATENT DOCUMENTS

| JP | 6-263661 | 9/1994 |
| JP | 6-312946 | 11/1994 |
| JP | 7-304694 | 11/1995 |
| JP | 10-265531 | 10/1998 |

*Primary Examiner*—Shean C Wu
(74) *Attorney, Agent, or Firm*—Oblon, Spivak, McClelland, Maier & Neustadt, P.C.

(57) ABSTRACT

Provided is a liquid crystalline compound which has a large value of refractive index anisotropy, exhibits a liquid crystal phase in a wide temperature range, and is stable under use conditions.

It is a liquid crystalline compound represented by the following formula (1):

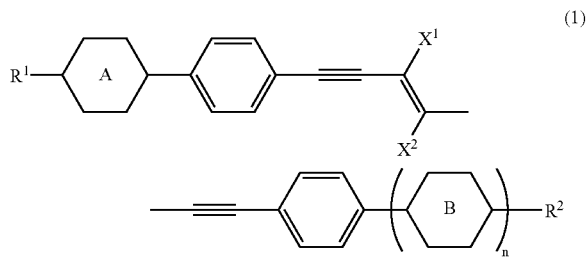

wherein the symbols in the formula have the following meanings:
$R^1$, $R^2$: each independently, an alkyl group, an alkenyl group, an alkoxy group, a halogen atom or a cyano group, wherein at least one hydrogen atom in each of the alkyl, alkenyl and alkoxy groups may be replaced with a chlorine or fluorine atom;
ring A, ring B: each independently, a trans-1,4-cyclohexylene group or a 1,4-phenylene group, wherein a hydrogen atom in each of these rings may be replaced with a chlorine atom, fluorine atom or methyl group;
$X^1$, $X^2$: each independently, a hydrogen or fluorine atom;
n: 0 or 1.

8 Claims, No Drawings

HEXENEDIYNE DERIVATIVE

TECHNICAL FIELD

The present invention relates to a novel liquid crystalline compound having a hexenediyne skeleton, a liquid crystal composition comprising the compound, and applications thereof.

BACKGROUND ART

Liquid crystal elements are widely used as e.g. displays in a display field and as e.g. diffraction elements and phase plates in an optical pickup field. These elements are required not only to have various properties such as a high contrast ratio, a wide view angle, a wide operating temperature range, a high-speed response, a low operating voltage and chemical stability, but also to decrease the thickness and size of the elements. Therefore, important physical properties are refractive index anisotropy, dielectric constant anisotropy, electrical conductivity, etc. of a liquid crystal material to be used for the liquid crystal elements, and in particular there is an increasing demand for a material with a large value of refractive index anisotropy.

For example, a product of a value of refractive index anisotropy (Δn) of a liquid crystal material and a thickness (d1) of a cell is required to be constant in the display elements. The recent display elements adopt a method of attaining good-quality display without domains by reducing d1, and a liquid crystalline compound with a large Δn value is needed for adjusting the Δn value of the liquid crystal material to an optimum value. Furthermore, because a response time can be reduced by decreasing the d1 value, a liquid crystalline compound with a large Δn value is extremely useful for producing a liquid crystal display element with a high response speed and good display quality.

Moreover, in the optical pickup field, it is proposed to realize a polarization diffractive element with high light utilization efficiency by forming a lattice-like rectangular structure on a transparent substrate and filling the structure with a liquid crystal material. When such a polarization diffractive element satisfies λ/2=Δn·d2 where d2 is a height of the lattice, Δn is a value of the refractive index anisotropy of the liquid crystal material, and λ is a wavelength of light to be used, the ±1st-order diffraction efficiency becomes maximum. In recent years, with downsizing of optical head apparatus, a lattice pitch p of the polarization diffractive element is becoming smaller and smaller. However, as an aspect ratio d2/p of the lattice becomes larger in accordance with the decrease in the pitch p, deviation from an ideal lattice-like structure becomes larger, which causes a problem of decrease in the diffraction efficiency. It is thus necessary to decrease the lattice height d2 and thereby decrease the aspect ratio. Namely, in order to satisfy both of the small aspect ratio and good diffraction efficiency, there is a demand for a liquid crystalline compound with a large value of refractive index anisotropy.

Compounds below are proposed heretofore as liquid crystalline compounds having a large value of refractive index anisotropy (in the formulae, $R^3$ and $R^4$ are each independently an alkyl group with a carbon number of from 2 to 12, an alkoxy group with a carbon number of from 2 to 12, a fluorine atom, a chlorine atom, a cyano group or a nitro group, and X3 is a hydrogen or fluorine atom).

(1) Tolan derivatives represented by the formula (A) below (cf. Patent Document 1)

(2) Butadiyne derivatives represented by the formula (B) below (cf. Non-patent Document 1)

(3) Stilbene derivatives represented by the formula (C) below (cf. Non-patent Document 2)

(4) Difluorostilbene derivatives represented by the formula (D) below (cf. Patent Document 2)

(5) Enyne derivatives represented by the formula (E) below (cf. Patent Document 3)

(6) Hexenediyne derivatives represented by the formula (F) below (cf. Patent Document 4)

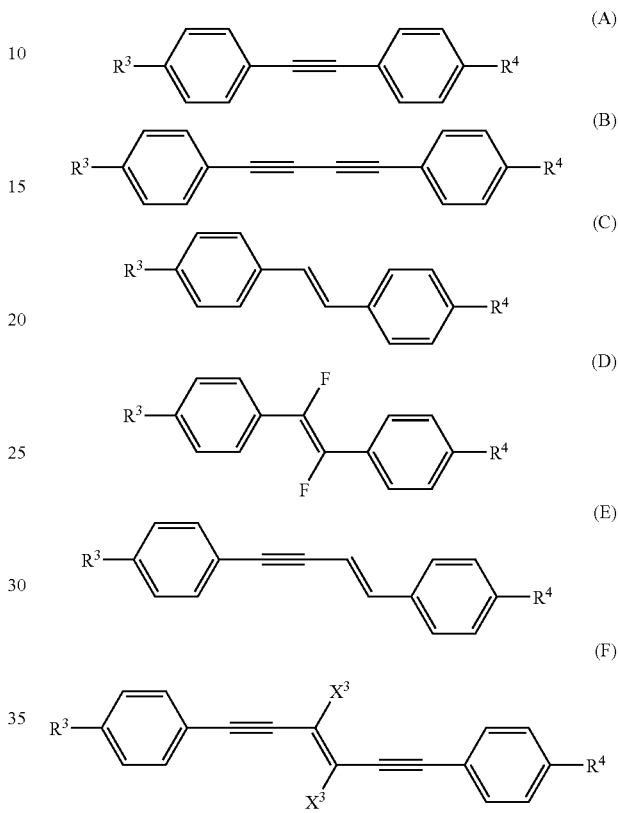

Patent Document 1: JP-A-1-502823
Patent Document 2: JP-A-3-294386
Patent Document 3: JP-A-6-312946
Patent Document 4: JP-A-7-304694
Non-patent Document 1: "Molecular Crystal Liquid Crystal", 1978, vol. 48, p. 175
Non-patent Document 2: "Liquid Crystal", 1993, vol. 15, p. 529-540

DISCLOSURE OF THE INVENTION

Objects to be Accomplished by the Invention

However, all the above-mentioned compounds had problems that the value of the refractive index anisotropy was insufficient and that a temperature range exhibiting liquid crystallinity was narrow. Furthermore, the compounds represented by the formula (B) had a problem that they were thermally unstable.

Means to Accomplish the Objects

The present invention has been made to solve the above-mentioned problems, and provides a novel liquid crystalline compound with a hexenediyne skeleton and a liquid crystal composition comprising the liquid crystalline compound. Namely, the present invention provides the following:

<1> A liquid crystalline compound represented by the following formula (1):

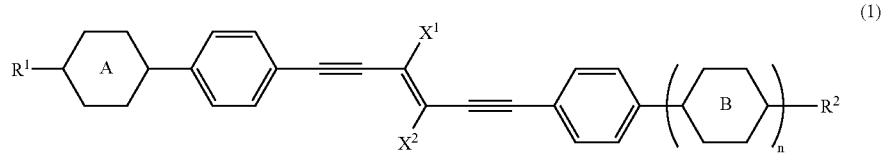

(1)

The symbols in the formula have the following meanings:

$R^1$, $R^2$: each independently, an alkyl group, an alkenyl group, an alkoxy group, a halogen atom or a cyano group, wherein at least one hydrogen atom in each of the alkyl, alkenyl and alkoxy groups may be replaced with a chlorine or fluorine atom;

ring A, ring B: each independently, a trans-1,4-cyclohexylene group or a 1,4-phenylene group, wherein a hydrogen atom in each of these rings may be replaced with a chlorine atom, fluorine atom or methyl group;

$X^1$, $X^2$: each independently, a hydrogen or fluorine atom;

n: 0 or 1.

<2> The liquid crystalline compound according to the above <1>, having at least one trans-1,4-cyclohexylene group.

<3> The liquid crystalline compound according to the above <1> or <2>, wherein each of $X^1$ and $X^2$ is a fluorine atom.

<4> A liquid crystal composition comprising at least one liquid crystalline compound as defined in the above <1>, <2> or <3>.

<5> The liquid crystal composition according to the above <4>, wherein a content of the liquid crystalline compound as defined in the above <1>, <2> or <3> is at least 0.5 mass % based on the liquid crystal composition.

<6> An optical element employing the liquid crystal composition as defined in the above <4> or <5>.

<7> An optical element for an optical pickup, employing the liquid crystal composition as defined in the above <4> or <5>.

<8> An optical pickup employing the optical element as defined in the above <7>.

Effects of the Invention

According to the present invention, it is possible to provide a novel liquid crystalline compound which has a large value of refractive index anisotropy, exhibits a liquid crystal phase in a wide temperature range, and is stable under use conditions.

BEST MODE FOR CARRYING OUT THE INVENTION

In the present invention, the compound represented by the formula (1) will also be referred to as "compound (1)". The same also applies to compounds represented by other formulae. In addition, a value of the refractive index anisotropy is abbreviated to "Δn." With respect to the description on wavelengths below, even when a wavelength is described as a value at one point, it is meant to cover the range of the described value ±2 nm.

The compound of the present invention is a novel liquid crystalline compound represented by the formula (1) below.

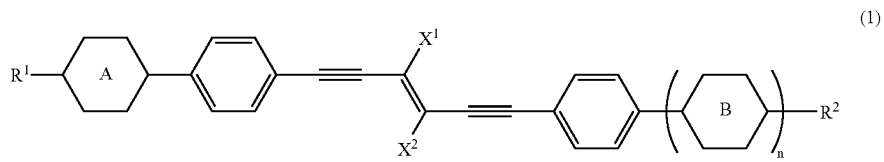

(1)

$R^1$ and $R^2$ are each independently an alkyl group, an alkenyl group, an alkoxy group, a halogen atom or a cyano group. When $R^1$ and $R^2$ are each independently an alkyl group, an alkenyl group or an alkoxy group, such a group preferably has a straight-chain structure because it can broaden the temperature range for exhibition of the liquid crystal phase and show a less decrease in Δn. Furthermore, at least one hydrogen atom in such a group may be replaced with a chlorine or fluorine atom, and, particularly, in a case where it is replaced with a fluorine atom, there is an advantage that the compound is improved in resistance to light in a short wavelength region of wavelengths of from 400 to 450 nm, approximately.

The carbon number of the above alkyl group and alkoxy group is preferably from 1 to 10, particularly preferably from 2 to 8, and especially preferably from 3 to 7 from the viewpoint of the temperature range of the nematic phase. Furthermore, the carbon number of the above alkenyl group is from 2 to 10, preferably from 2 to 6. In addition, in a case where the carbon number is an even number, the above alkenyl group is preferably a group having a double bond extending from the carbon atom at the end of the alkenyl chain toward the ring group because an elastic constant ratio ($K_{33}/K_{11}$) is large. In a case where the carbon number is an odd number, the alkenyl group is preferably a group having a double bond extending from the second carbon atom from the end of the alkenyl chain toward the ring group because the elastic constant ratio becomes large and a response speed becomes high.

In a case where each of $R^1$ and $R^2$ is a halogen atom, each of them is preferably a chlorine or fluorine atom, and is particularly preferably a fluorine atom from the viewpoint of decrease in the wavelength of absorbed light, high compatibility and decrease in the viscosity.

Each of $R^1$ and $R^2$ is independently preferably a straight-chain alkyl group with a carbon number of from 1 to 10, a straight-chain alkoxy group with a carbon number of from 1 to 10, a straight-chain alkenyl group with a carbon number of from 2 to 10, a perfluoroalkyl group with a carbon number of from 1 to 6 or a perfluoroalkoxy group with a carbon number of from 1 to 6 from the viewpoint of a temperature range for exhibition of the nematic phase and a less decrease in Δn. Among them, a straight-chain alkyl group with a carbon number of from 3 to 7 or a straight-chain alkoxy group with a carbon number of from 3 to 7 is particularly preferred from the viewpoint of a wide temperature range in which the compound (1) exhibits the liquid crystallinity.

$X^1$ and $X^2$ are each independently a hydrogen or fluorine atom, and at least one of them is preferably a fluorine atom. In the present invention, each of $X^1$ and $x^2$ is preferably a fluorine atom from the viewpoint of decrease in the wavelength of absorbed light and high light resistance.

The ring groups A and B are each independently a trans-1,4-cyclohexylene or 1,4-phenylene group. Each of these groups may be an unsubstituted group or a group wherein a hydrogen atom in the group is replaced with a chlorine atom, a fluorine atom or a methyl group. When the group has a substituent, the number of substituents is from 1 to 4, and particularly preferably 1 or 2 from the viewpoint of the temperature range for exhibition of the nematic phase. Each of the ring group A and ring group B is preferably an unsubstituted group from the viewpoint of the temperature range for exhibition of the nematic phase and also from suppression of decrease in Δn.

Each of the ring group A and ring group B is preferably a 1,4-phenylene group in that the value of Δn of the compound (1) can be increased. Furthermore, they are preferably a trans-1,4-cyclohexylene group in that the transmittance of light used can be improved and the compatibility with another compound can be enhanced.

n is 0 or 1.

When n is 0, there are advantages that a crystal-nematic phase transition point of the compound (1) can be lowered and that the compatibility with another liquid crystalline compound or the like is excellent. When n is 1 and each of the ring group A and ring group B is a trans-1,4-cyclohexylene group, there are advantages that the transmittance of light to be used is high and that a temperature range to exhibit the liquid crystal phase can be broadened. In a case where n is 1; the ring group A is a trans-1,4-cyclohexylene group; and the ring group B is a 1,4-phenylene group, the compound shows an extremely large value of Δn.

Examples of the compound (1) include compounds (1Fa) to (1Fd) below, compounds (1Ha) to (1Hd) below, and so on; and preferred compounds are the compounds (1Fa), (1Fc), (1Fd), (1Ha), (1Hc) and (1Hd) below having at least one trans-1,4-cyclohexylene group. When the compounds (1Fa), (1Fc) and (1Fd) below contain a cyclohexyl group, they are particularly preferred because absorption occurs in a shorter wavelength region, which is advantageous from the viewpoint of light resistance (the symbols in the formulae have the same meanings as above).

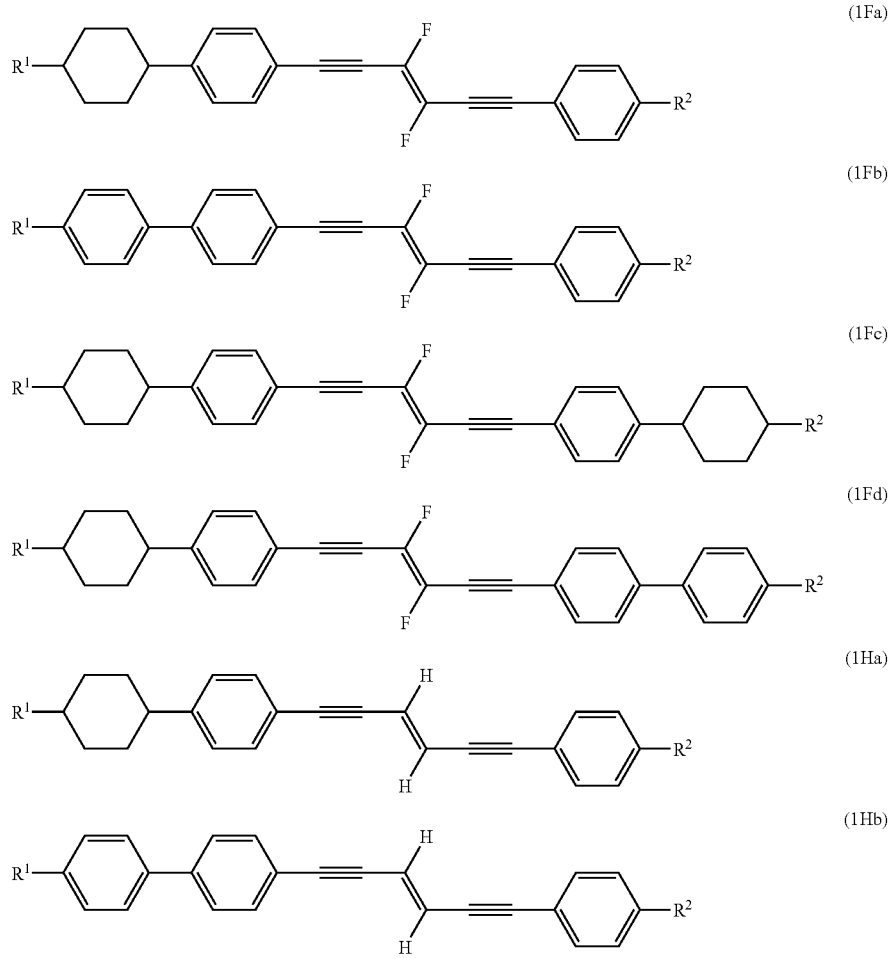

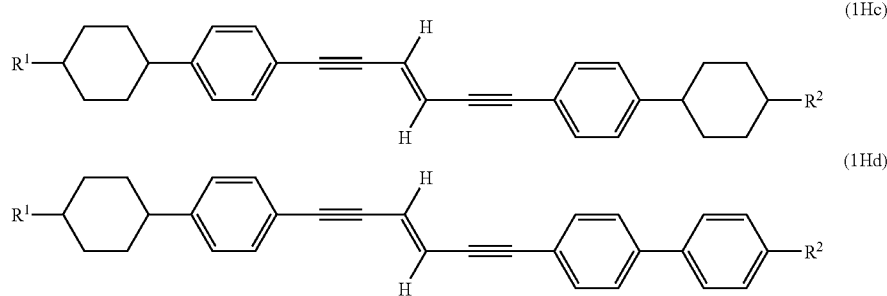

Specifically, the compounds below are preferred. In the formulae, $R^5$ and $R^6$ are each independently a straight-chain alkyl group with a carbon number of from 1 to 10 or a straight-chain alkoxy group with a carbon number of from 1 to 10. $R^5$ and $R^6$ are each independently preferably a straight-chain alkyl group with a carbon number of from 2 to 8 or a straight-chain alkoxy group with a carbon number of from 2 to 8, and particularly preferably a straight-chain alkyl group with a carbon number of from 3 to 7 or a straight-chain alkoxy group with a carbon number of from 3 to 7 from the viewpoint of a temperature range for exhibition of the nematic phase.

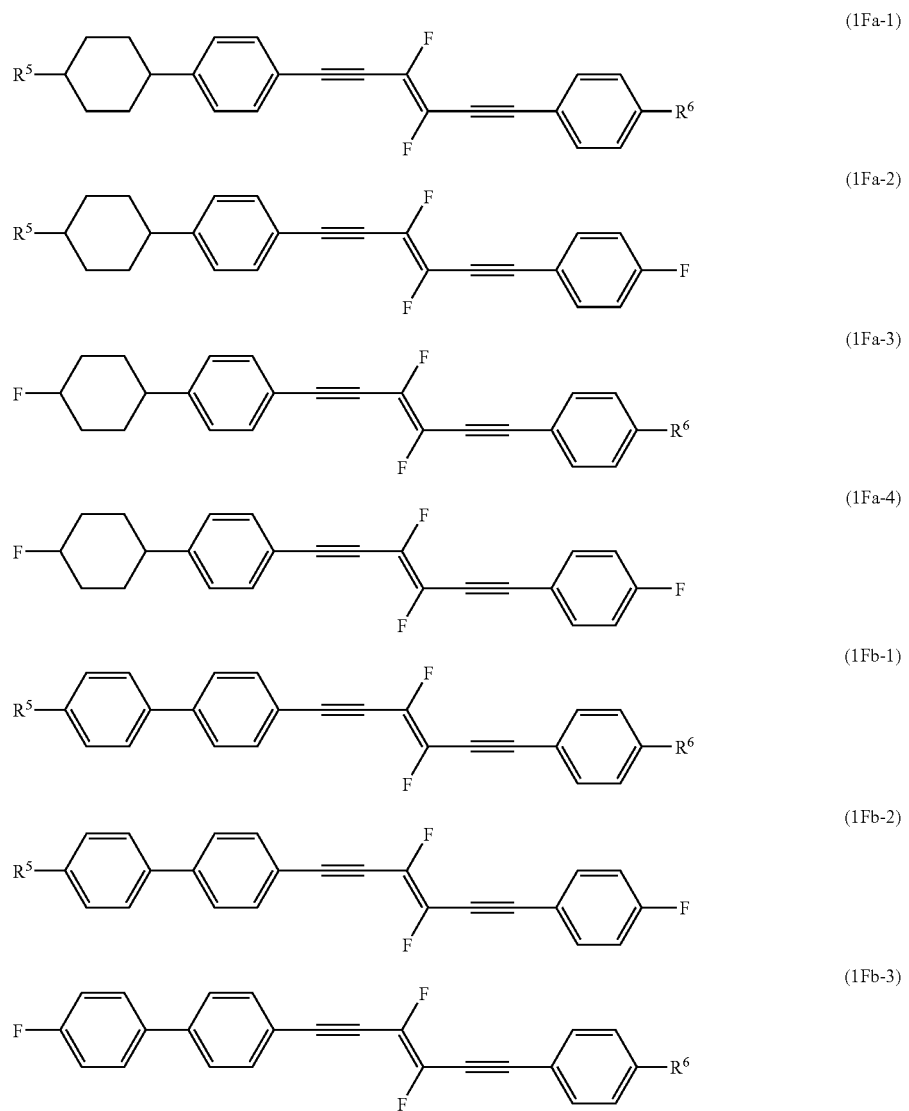

-continued

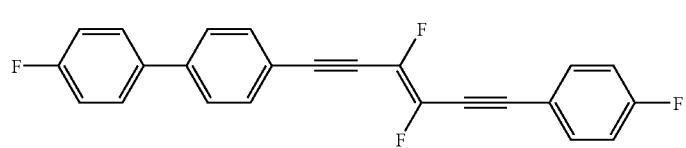
(1Fb-4)

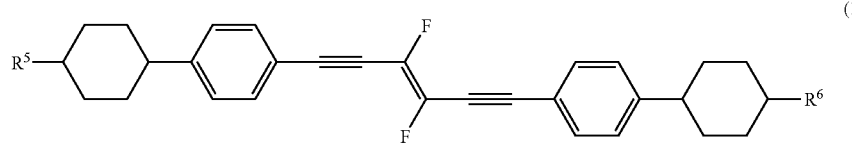
(1Fc-1)

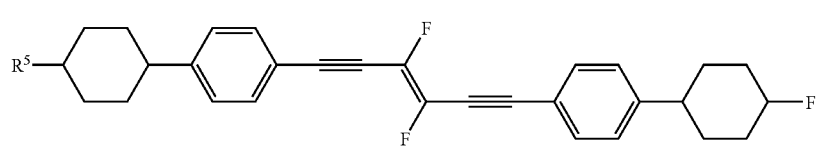
(1Fc-2)

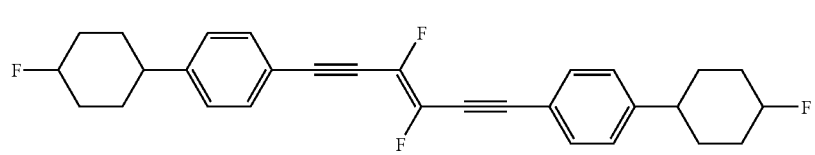
(1Fc-3)

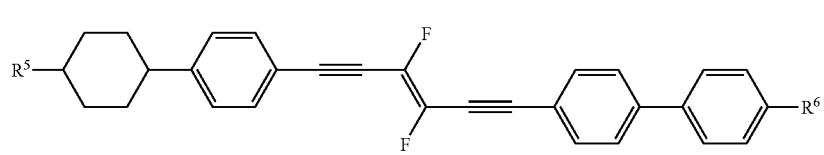
(1Fd-1)

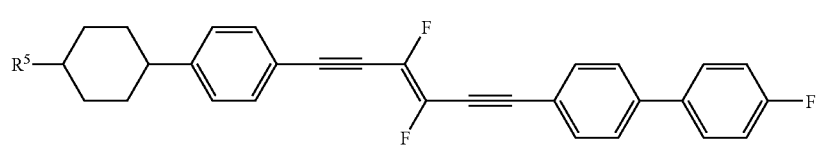
(1Fd-2)

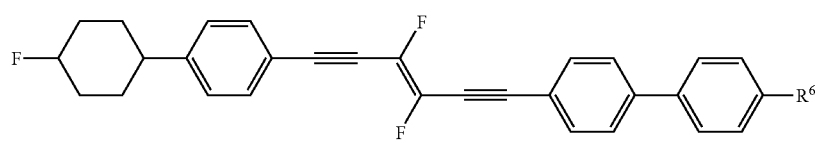
(1Fd-3)

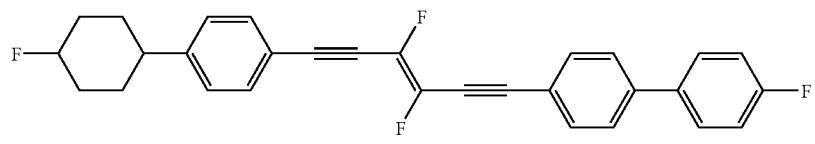
(1Fd-4)

The compound (1) of the present invention can be synthesized, for example, by the method below. The synthesis method of the compound (1F) wherein each of $X^1$ and $X^2$ is a fluorine atom in the compound (1), may be the following method. Namely, the compound (a1) below and the compound (b) below are subjected to coupling in the presence of a transition metal complex catalyst to obtain the compound (c1) below. Then, the compound (c1) and the compound (d) below are subjected to coupling to obtain the compound (1F)

(wherein $R^1$, $R^2$, the ring group A, the ring group B and n in the formulae have the same meanings as above).

As the transition metal complex catalyst, a palladium catalyst such as $PdCl_2[P(C_6H_5)_3]_2$ or $Pd[P(C_6H_5)_3]_4$ may be used. Furthermore, a copper salt such as copper iodide or copper bromide can be used as a co-catalyst together with the palladium catalyst if necessary. As a solvent, a secondary amine, a tertiary amine or an amide may be used, and specific examples thereof include piperidine, piperazine, morpholine, pyridine, triethylamine and dimethylformamide.

obtain the compound (1H) (wherein $R^1$, $R^2$, the ring group A, the ring group B and n in the formulae have the same meanings as above, and $X^5$ and $X^6$ are each independently

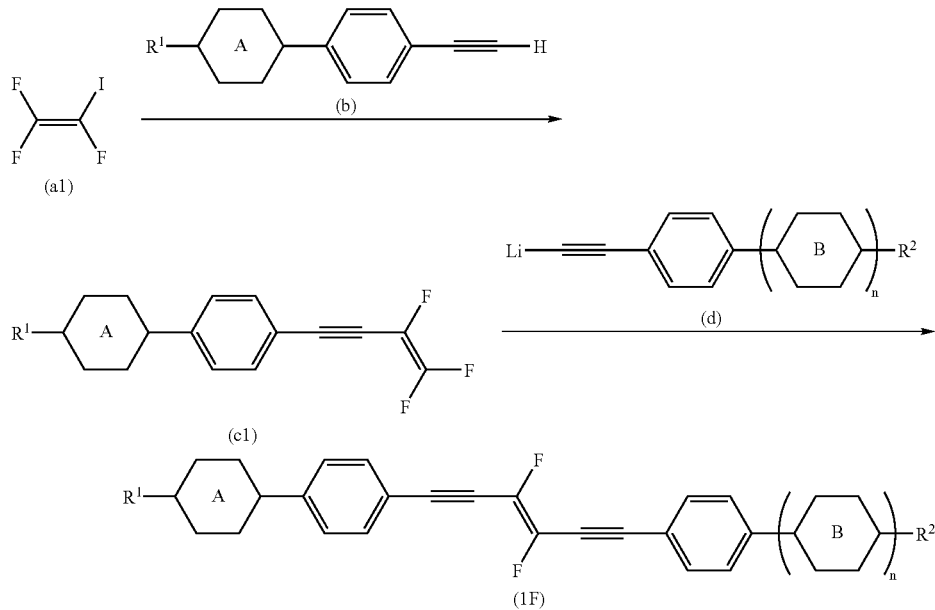

The synthesis method of the compound (1H) wherein each of $X^1$ and $X^2$ is a hydrogen atom in the compound (1), may be the following method. Namely, the compound (a2) below and the compound (b) below are subjected to coupling in the presence of a transition metal complex catalyst a chlorine, bromine or iodine atom) The coupling reaction with use of the transition metal complex catalyst may be carried out in the same manner as in the synthesis of the above compound (1F).

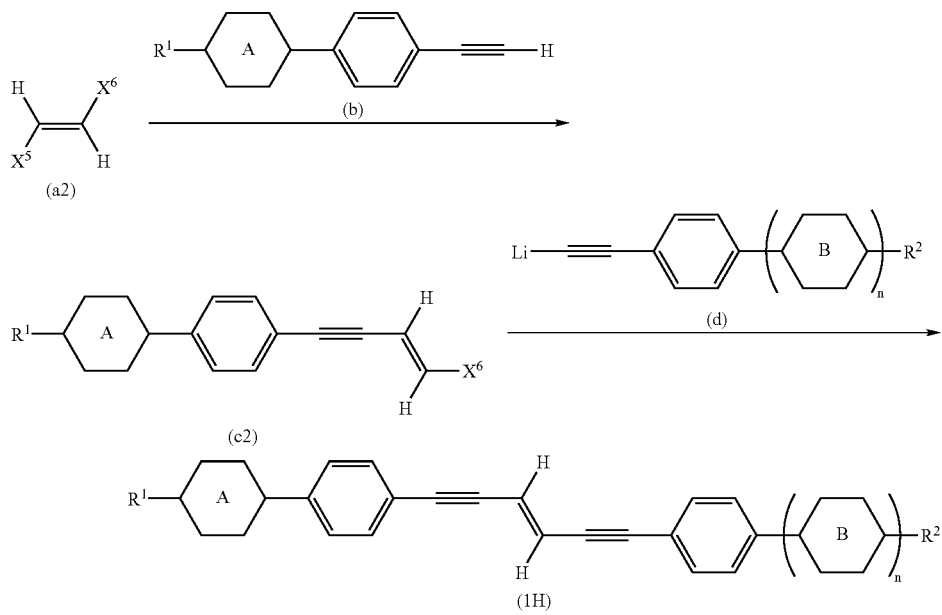

to obtain the compound (c2) below. Then, the compound (c2) and the compound (d) below are subjected to coupling in the presence of a transition metal complex catalyst to The compound (1) of the present invention shows an extremely large value of An because it has a highly conjugated structure (90) below.

(90)

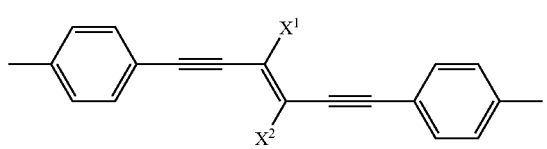

Furthermore, the compound (1) of the present invention preferably has such a structure that it has at least one trans-1,4-cyclohexylene group as described above. Having the structure, the compound of the present invention has advantages that the transmittance of light to be used is high and that a temperature range for exhibition of liquid crystallinity is wide. Furthermore, when the compound (1) is mixed with another liquid crystalline compound and used as a liquid crystal composition, it has good compatibility with such another liquid crystalline compound.

A trans form and cis form can exist in the compound (1) with respect to the carbon-carbon double bond site in the structure represented by the above structure (90), and the compound of the present invention preferably includes the trans form as a main component from the viewpoint of a wide temperature range for exhibition of the nematic phase. As a ratio of the trans form and cis form, a ratio of the trans form and cis form measured by gas chromatography, high performance liquid chromatography, NMR, or the like, is preferably at least 0.95, particularly preferably at least 0.98 in terms of trans form/(trans form+cis form).

Moreover, the compound (1) wherein each of $X^1$ and $X^2$ is a fluorine atom, is excellent in the light resistance with no absorption in the visible light region, in spite of the highly conjugated structure, because it has a trans-difluorohexenediyne structure in which the trans position relative to the double bond in the above hexenediyne structure is replaced with a fluorine atom. In addition, there are also advantages that the viscosity is low and that a crystal-nematic phase transition point is low.

It is preferred to mix the compound (1) of the present invention with another liquid crystalline compound and use the mixture as a liquid crystal composition. Examples of such another liquid crystalline compound include compounds below (wherein each of R7, R8 and $R^9$ which are independent of one another, is an alkyl group, an alkenyl group, or an alkyl group substituted by a halogen atom in the formulae). The compound (1) may also be used as mixed with a commercially available nematic liquid crystal composition.

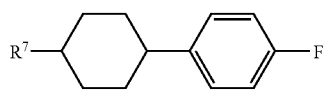

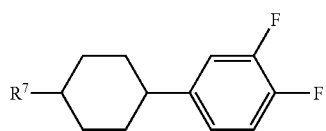

-continued

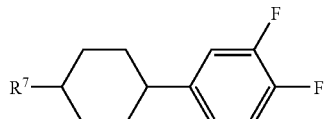

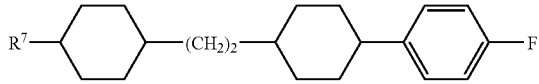

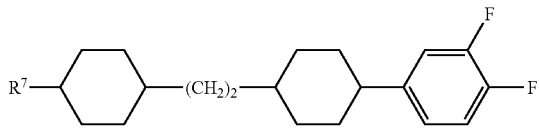

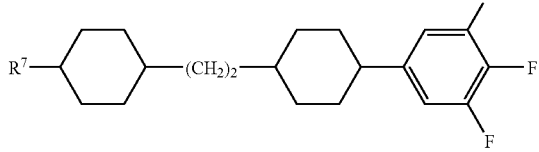

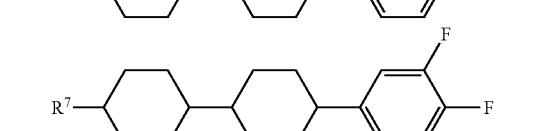

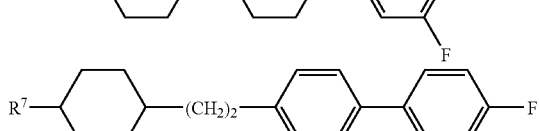

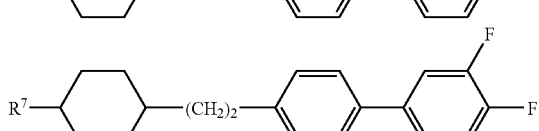

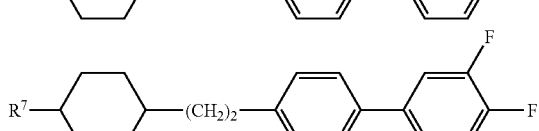

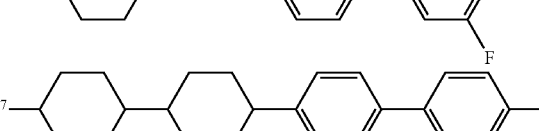

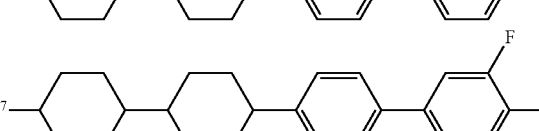

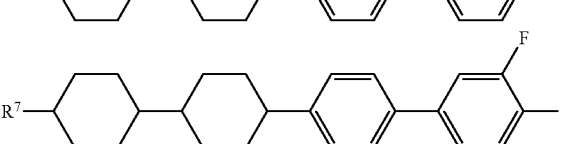

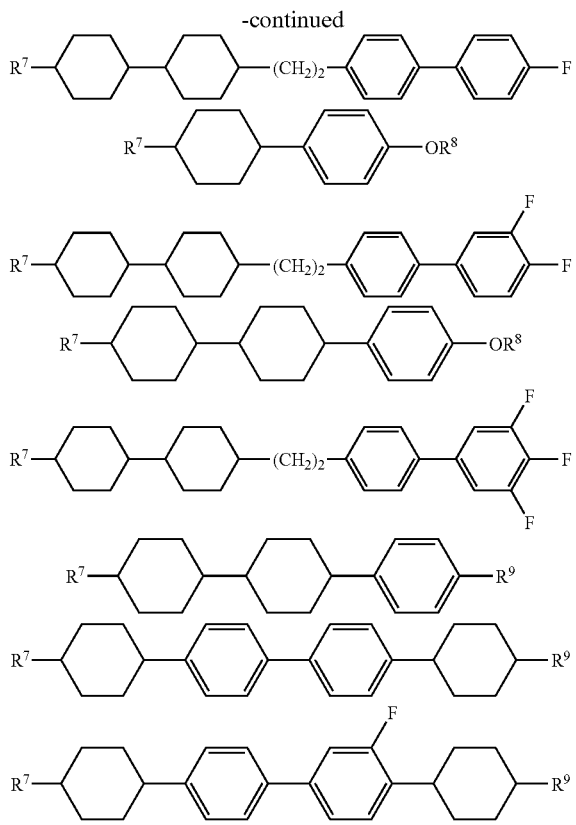

An amount of the compound (1) contained in the liquid crystal composition of the present invention is at least 0.5 mass %, preferably from 2 to 30 mass %, particularly preferably from 3 to 20 mass % based on the liquid crystal composition. The value of An of the liquid crystal composition can be dramatically increased by use of the compound (1) in the amount in the above range.

Furthermore, the liquid crystal composition of the present invention may contain a component (hereinafter referred to as "another component"), other than the compound (1) and such another liquid crystalline compound depending on applications. Examples of such another component include a chiral material, an ultraviolet absorber, an antioxidant, a light stabilizer and a dichroic dye.

It is preferred to adjust a total amount of the compound (1) and such another liquid crystalline compound contained in the liquid crystal composition (hereinafter referred to as "total amount of liquid crystal") and the proportion of such another component, depending on applications. For example, when a chiral material is used as such another component, the total amount of liquid crystals is preferably from 30 to 95 mass %, particularly preferably from 50 to 95 mass % based on the liquid crystal composition. A proportion of the chiral material is preferably from 5 to 70 mass % and particularly preferably from 5 to 50 mass % based on the liquid crystal composition.

When a dichroic dye is used as such another component, the total amount of liquid crystal is preferably from 80 to 99 mass % and particularly preferably from 82 to 97 mass % based on the liquid crystal composition. A proportion of the dichroic dye is preferably from 1 to 20 mass % and particularly preferably from 3 to 18 mass % based on the liquid crystal composition.

When an ultraviolet absorber, an antioxidant, a light stabilizer or the like is used as such another component, a proportion of such a component is preferably at most 5 mass %, particularly preferably at most 2 mass % based on the liquid crystal composition. In this case, the total amount of liquid crystals is preferably from 95 to 100 mass %, particularly preferably from 98 to 100 mass % based on the liquid crystal composition.

Furthermore, the compound (1) of the present invention may also be used as a PDLC (Polymer Dispersed Liquid Crystal) by subjecting the compound to polymerization with a polymerizable monomer such as an acrylate or methacrylate.

The liquid crystal composition of the present invention is usefully applicable to a display element or an optical element. Such a device or element may be fabricated by one of the known techniques and it may be fabricated, for example, by the following method.

A pair of laminates, in each of which an electrode and an alignment layer are laminated in this order on a transparent substrate, are arranged so that the alignment layers face each other, and the periphery of the laminates is sealed with a sealing material to assemble and fabricate a cell.

The transparent substrate is preferably a transparent glass substrate or a transparent resin substrate, particularly preferably a transparent glass substrate because of its high rigidity. A thickness of the transparent substrate is preferably from 0.2 to 1.5 mm, particularly preferably from 0.3 to 1.1 mm. The electrode is preferably a film-like transparent electrode in which a transparent conductive film such as an ITO film or an $SnO_2$ film is laminated on a surface of the transparent substrate by a method such as evaporation or sputtering. The film-like transparent electrode is preferably subjected to patterning by a method such as photolithography or wet etching depending on applications.

The alignment layer is laminated on a surface of the electrode. One of the known methods may be adopted as a method for laminating the alignment layer, and examples of the method include a method of applying a polyamic acid solution onto a surface of the transparent substrate on which the electrode is laminated, and then baking the substrate; a method of applying a soluble polyimide solution onto a surface of the transparent substrate on which the electrode is laminated, and then volatilizing the solvent; a method of depositing by oblique evaporation of an inorganic material such as $SiO_2$; and so on. Furthermore, the surface of the alignment layer composed of an organic material such as polyimide is preferably subjected to rubbing treatment.

Then, a pair of the above laminates are set up and a sealing material such as an epoxy resin is circularly applied onto the periphery of the surface of at least one of the laminates, on which the alignment layer is formed. The sealing material may be preliminarily mixed with e.g. spacers for obtaining a desired cell gap, or conductive fine particles for conductive paths for application of voltage. Then, the pair of laminates are arranged so that the surfaces of the alignment layers face each other, with a desired clearance (cell gap) and a bonding angle (an angle between the rubbing directions of the respective alignment layers on the pair of substrates opposing each other), and then the sealing material is cured to form an empty cell. The cell gap is preferably from 1 to 20 μm, particularly preferably from 3 to 10 μm from the viewpoint of a response speed and productivity. A discontinuous part for an injection port for injecting the liquid crystal composition is formed at least in part in the circular applying portion of the sealing material and the liquid crystal composition is injected from the injection port to fabricate a liquid crystal element.

The structure of the liquid crystal element is not restricted to the above structure, and it is also possible, for example, to adopt the following structures: an antireflection film is laminated on a surface opposite to the surface of the transparent substrate on which the electrode is laminated; a phase plate or the like is laminated; a rectangular structure of concave-convex shape is provided on a surface of the substrate.

The optical element of the present invention is useful for a display, a projection television and the like in the display field and useful for an optical element used for a laser beam in the optical pickup field. The optical element may, for example, be a phase plate, a diffractive element or a liquid crystal lens.

The optical element is suitable for a phase plate and a polarization diffractive element in which a lattice-like rectangular structure is formed and filled with a liquid crystal material. Particularly, when the optical element of the present invention is used as an optical element in an optical pickup with a laser source, a photodetector, an optical element and an objective lens, the optical pickup can demonstrate excellent properties in terms of reduction in size and wavelength.

EXAMPLES

Now, the present invention will be described in detail with reference to Examples, but it should be understood that the present invention is by no means restricted to such specific Examples. It is noted that gas chromatography-mass spectrometry, tetrahydrofuran and liter are abbreviated hereinafter to "GC-MS," "THF" and "l", respectively.

Example 1

Synthesis of Compound (1Fa-1a)

Example 1-1

Synthesis of Compound (c1-1)

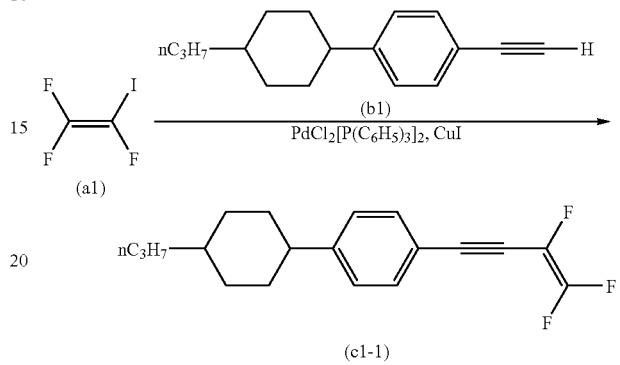

$PdCl_2[P(C_6H_5)_3]_2$ (350 mg) and copper iodide (50 mg) were introduced into a flask, and an interior of the system is replaced with nitrogen. A piperidine solution of the compound (b1) (1.3 g) was added into the system under a nitrogen stream. A piperidine solution of the compound (a1) (1.0 g) was dropwise added into the system under stirring at room temperature. After completion of the dropwise addition, the mixture was further stirred at room temperature for five hours. After completion of the stirring, water was added into the crude reaction product and it was extracted with heptane. The organic layer was washed with water and dried with anhydrous magnesium sulfate, followed by concentration under reduced pressure. The brown oily substance thus obtained was purified by silica gel column chromatography and recrystallized from ethanol to obtain the compound (c1-1) (1.4 g) The structure of the compound (c1-1) was determined by $^1$HNMR spectrum and GC-MS spectrum analysis.

Example 1-2

Synthesis of Compound (1Fa-1a)

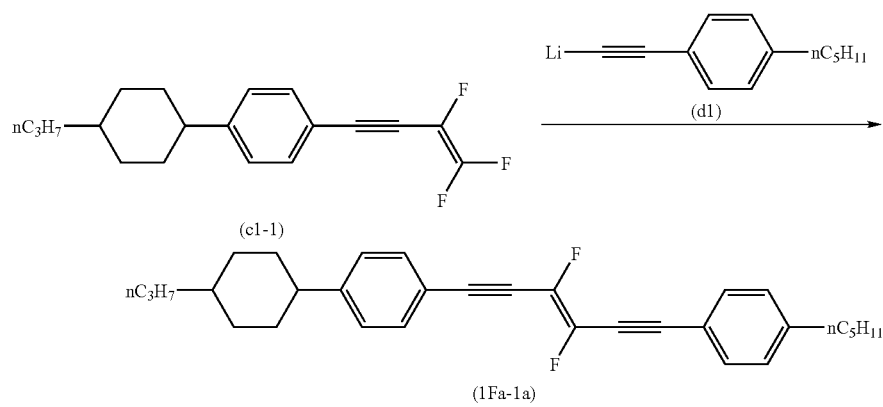

4-n-pentylphenylacetylene (0.9 g) was introduced into a flask, THF (30 ml) was added thereto, and the mixture was cooled to −78° C. with stirring. n-butyllithium (1.6 M hexane solution, 12.5 ml) was added thereto. The mixture was stirred for 30 minutes while maintaining the internal temperature at −78° C., to obtain a THF solution of lithium acetylide of 4-n-pentyl phenylacetylene (the compound (d1)), and the resulting solution was transferred into a dripping funnel under a nitrogen stream.

The compound (c1-1) (1.2 g) obtained in Example 1-1 was introduced into another flask, THF (100 ml) was added thereto, followed by cooling to −78° C. The internal temperature was maintained at −78° C. under stirring, and the THF solution of the compound (d1) was dropwise added from the dropping funnel. After completion of the dropwise addition, the temperature of the reaction solution was raised to room temperature and stirred further for 30 minutes. Ice water was added into the reaction solution and the resultant was extracted with ether. An organic layer was washed with water, dried, and concentrated under reduced pressure to obtain a yellow oily substance. The oily substance was purified by silica gel column chromatography to obtain a white solid. The white solid was recrystallized from ethanol to obtain the compound (1Fa-1a) (2.5 g) as a white crystal. The structure of the compound (1Fa-1a) was determined by $^1$HNMR, $^{13}$CNMR and GC-MS spectrum analysis. A value of trans form/(trans form+cis form) with respect to the carbon-carbon double bond site was 0.97.

The transition temperature of the compound (1Fa-1a) from the crystal to the nematic phase was 70.6° C. and the transition temperature from the nematic phase to the isotropic phase was 220° C. Furthermore, the compound (1Fa-1a) had the value of refractive index anisotropy (Δn) of 0.455 for the laser beam of the wavelength of 589 nm and Δn of 0.754 for the laser beam of the wavelength of 405 nm.

$^1$HNMR (solvent: CDCl$_3$, internal standard: TMS): δ(ppm) 0.89 (t, 6H), 1.0-1.7 (m, 15H), 1.8-1.9 (d, 4H), 2.45 (m, 1H), 2.61 (t, 2H), 7.14-7.46 (dd, 8H). $^{13}$CNMR (solvent: CDCl$_3$, internal standard: TMS): δ(ppm) 13.98, 14.38, 20.00, 22.49, 30.81, 31.39, 33.39, 34.03, 35.97, 36.94, 39.64, 44.69, 75.99, 101.13, 106.64, 118.14, 127.09, 128.63, 131.54, 136.33, 139.87, 145.20, 150.07. MS: 458 (M+)

Example 2

Preparation of Liquid Crystal Composition 1

A nematic liquid crystal (manufactured by Merck Ltd., product number: ZLI1565, the value of refractive index anisotropy for the laser beam of the wavelength of 589 nm: 0.118) and the compound (1Fa-1a) obtained in Example 1 were mixed at a ratio of 19:6 (mass ratio) to prepare liquid crystal composition 1. The liquid crystal composition 1 had a transition temperature of −2° C. from the crystal to the nematic phase and a transition temperature of 108.4° C. from the nematic phase to the isotropic phase. Furthermore, the liquid crystal composition 1 had Δn of 0.388 for the laser beam of the wavelength of 589 nm and Δn of 0.630 for the laser beam of the wavelength of 405 nm.

Example 3

Preparation of Liquid Crystal Composition 2

JC1041xx (manufactured by Chisso Corporation) and the compound (1Fa-1a) obtained in Example 1 were mixed at a ratio of 19:1 (mass ratio) to prepare liquid crystal composition 2. The liquid crystal composition 2 was good in compatibility and neither crystal precipitation nor phase separation was observed therein. Furthermore, the liquid crystal composition 2 exhibited the nematic phase at 25° C. and Tc at 119° C., thereby confirming that the liquid crystal composition 2 exhibited the liquid crystallinity. The liquid crystal composition 2 had Δn of 0.173 for the laser beam of the wavelength of 589 nm and Δn of 0.199 for the laser beam of the wavelength of 405 nm.

Example 4

Fabrication of Optical Element

Two plates of transparent glass substrates with a length of 100 mm, a width of 100 mm and a thickness of 0.53 mm were prepared. An ITO transparent conductive film was formed in a thickness of 15 nm on a surface of each substrate, and was patterned by photolithography and wet etching to form a transparent electrode. Then, a polyamic acid solution (manufactured by Nissan Chemical Industries Ltd., product number: SE510) was applied onto each transparent electrode by spin coating and it was baked, thereby laminating a polyimide alignment layer of about 50 nm in thickness. The polyimide alignment layers were subjected to rubbing treatment with rayon cloth to obtain a pair of laminates.

An epoxy-type sealing material (to which fiber spacers with a diameter of 3.2 μm and acrylic balls with a conductive coating were added) was printed by screen printing at the periphery of the surface of one of the foregoing laminates on which the polyimide alignment layer was laminated. Then, the other laminate was overlaid so that the polyimide alignment layers faced each other and that the bonding angle was about 180° C., and they were subjected to pressure bonding at a pressure of $6 \times 10^4$ N/m$^2$, followed by heat curing at 170° C. After completion of the heat curing, the laminates were cooled and cut into a size of length of 5 mm and width of 5 mm to fabricate a cell.

Then, the liquid crystal composition 2 prepared in Example 3 was poured into the cell prepared above and the injection port was sealed with a thermosetting adhesive to fabricate an optical element. Liquid crystal molecules in the optical element were horizontally oriented along the rubbing directions. The optical element was irradiated with a laser beam of the wavelength of 405 nm and intensity of 30 mW for 7000 hours. The polarizing direction of the laser beam was arranged in parallel with the rubbing directions of the liquid crystal molecules. The optical element has no change in the properties before and after the irradiation with the laser beam and thus had good light resistance.

INDUSTRIAL APPLICABILITY

The compound of the present invention is a compound that has a large value of refractive index anisotropy, exhibits the liquid crystal phase in a wide temperature range and is stable under use conditions. The liquid crystal composition with sufficiently large refractive index anisotropy can be prepared from the compound, even in a small amount, so that the compound is usefully applicable as a material for an optical element such as a display element, a diffractive element and a phase plate.

The entire disclosure of Japanese Patent Application No. 2004-371368 filed on Dec. 22, 2004 including the specification, claims, and summary is incorporated herein by reference in its entirety.

What is claimed is:

1. A liquid crystalline compound represented by the following formula (1)

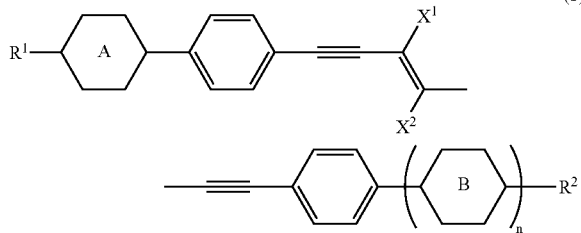

wherein the symbols in the formula have the following meanings:

$R^1$, $R^2$: each independently, an alkyl group, an alkenyl group, an alkoxy group, a halogen atom or a cyano group, wherein at least one hydrogen atom in each of the alkyl, alkenyl and alkoxy groups may be replaced with a chlorine or fluorine atom;

ring A, ring B: each independently, a trans-1,4-cyclohexylene group or a 1,4-phenylene group, wherein a hydrogen atom in each of these rings may be replaced with a chlorine atom, fluorine atom or methyl group;

$X^1$, $X^2$: each independently, a hydrogen or fluorine atom;

n: 0 or 1.

2. The liquid crystalline compound according to claim 1, having at least one trans-1,4-cyclohexylene group.

3. The liquid crystalline compound according to claim 1, wherein each of $X^1$ and $X^2$ is a fluorine atom.

4. A liquid crystal composition comprising at least one liquid crystalline compound as defined in claim 1.

5. The liquid crystal composition according to claim 4, wherein a content of the liquid crystalline compound is at least 0.5 mass % based on the liquid crystal composition.

6. An optical element employing the liquid crystal composition as defined in claim 4.

7. An optical element for an optical pickup, employing the liquid crystal composition as defined in claim 4.

8. An optical pickup employing the optical element as defined in claim 7.

* * * * *

UNITED STATES PATENT AND TRADEMARK OFFICE
CERTIFICATE OF CORRECTION

| | | |
|---|---|---|
| PATENT NO. | : 7,374,700 B2 | Page 1 of 1 |
| APPLICATION NO. | : 11/767215 | |
| DATED | : May 20, 2008 | |
| INVENTOR(S) | : Yuriko Kaida et al. | |

It is certified that error appears in the above-identified patent and that said Letters Patent is hereby corrected as shown below:

Item (63) on the title page should read: --Continuation of application No. PCT/JP2005/023522, filed on December 21, 2005--

Signed and Sealed this

Twenty-eighth Day of July, 2009

JOHN DOLL
*Acting Director of the United States Patent and Trademark Office*